United States Patent
Shimek

(10) Patent No.: US 11,981,861 B2
(45) Date of Patent: May 14, 2024

(54) ACID CORROSION INHIBITORS

(71) Applicant: Saudi Arabian Oil Company, Dhahran (SA)

(72) Inventor: Nicole Shimek, Katy, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/724,132

(22) Filed: Apr. 19, 2022

(65) Prior Publication Data

US 2022/0333002 A1     Oct. 20, 2022

Related U.S. Application Data

(60) Provisional application No. 63/177,178, filed on Apr. 20, 2021.

(51) Int. Cl.
| | |
|---|---|
| *C09K 8/54* | (2006.01) |
| *C09K 23/18* | (2022.01) |
| *C09K 23/38* | (2022.01) |
| *C09K 23/42* | (2022.01) |

(52) U.S. Cl.
CPC ............ *C09K 8/54* (2013.01); *C09K 23/18* (2022.01); *C09K 23/38* (2022.01); *C09K 23/42* (2022.01)

(58) Field of Classification Search
CPC .......... C09K 8/54; C09K 23/18; C09K 23/38; C09K 23/42; C09K 2208/32; C09K 8/74; C23F 11/04
See application file for complete search history.

(56) References Cited

U.S. PATENT DOCUMENTS

| | | | | |
|---|---|---|---|---|
| 6,117,364 A | * | 9/2000 | Vorderbruggen | ...... C09K 15/06 507/263 |
| 10,604,850 B2 | | 3/2020 | Reyes et al. | |
| 11,180,856 B1 | * | 11/2021 | Obot | ...................... C23F 11/185 |
| 2016/0231247 A1 | * | 8/2016 | Abla | .................. G01N 21/6428 |
| 2020/0362226 A1 | * | 11/2020 | Obot | ........................ C09K 8/74 |
| 2020/0369951 A1 | | 11/2020 | Quraishi et al. | |
| 2021/0230476 A1 | * | 7/2021 | Purdy | ................... C09K 8/032 |

FOREIGN PATENT DOCUMENTS

| | | | |
|---|---|---|---|
| CN | 106367057 A | * | 2/2017 |
| CN | 106367057 A | | 2/2017 |
| WO | 2019217497 A1 | | 11/2019 |

OTHER PUBLICATIONS

International Search Report Issued in Application No. PCT/IB2022/053661, dated Jul. 8, 2022, 5 pages.
Written Opinion Issued in Application No. PCT/IB2022/053661, dated Jul. 8, 2022, 7 pages.

* cited by examiner

*Primary Examiner* — Kumar R Bhushan

(74) *Attorney, Agent, or Firm* — Osha Bergman Watanabe & Burton LLP

(57) ABSTRACT

An acid corrosion inhibitor includes an active corrosion intermediate including alkylated pyridine, an internal intensifier including formic acid, a filming additive including cinnamaldehyde, a surfactant including one or more of propylene glycol methyl ether and alcohol ethoxylate, and a solvent including ethylene glycol. A system includes a formulation, an acid system including HCl and MSA, and a metal surface contacting the formulation and/or the acid system. The formulation of the system includes an alkyl pyridine, formic acid, cinnamaldehyde, and one or of propylene glycol methyl ether and alcohol ethoxylate. A method for reducing corrosion of a pipe in contact with an acid system and disposed in a well bore includes applying the acid corrosion inhibitor. The acid system includes methanesulfonic acid.

28 Claims, No Drawings

ACID CORROSION INHIBITORS

CROSS-REFERENCE TO RELATED APPLICATIONS

This application claims priority to U.S. Provisional Application No. 63/177,178, filed on Apr. 20, 2021, the entirety of which is incorporated herein by reference.

FIELD

The present application relates generally to compositions and methods for inhibiting acid corrosion.

BACKGROUND

It has been estimated that a significant portion of the world's oil and gas reserves lie in carbonate reservoirs with values estimated at 60% and 40%, respectively (Schlumberger Market Analysis, 2007). The mineralogy of these heterogeneous carbonate formations primarily consists of calcite, dolomite or combinations thereof. Production enhancement methods routinely rely on the use of suitable acid stimulation technologies useful for dissolving calcium and magnesium-based carbonates. Several acid platforms have been proposed and are widely used by oil and gas operators to stimulate rock formations. These include but are not limited to use of strong mineral acids (for example, hydrochloric acid, HCl), gelled and emulsified acids, organic-based acids such as formic acid ($CH_2O_2$) and acetic acid ($C_2H_4O_2$) and combinations thereof.

While these technologies are effective, strong acids are corrosive to steel and other metal substrates that are present in the wells, for example, as part of the well casings. Corrosion represents a large portion of the total costs for oil and gas production, because corrosion occurs at all stages from downhole to surface equipment and processing facilities. For example, leaks in tanks, casings, tubing, pipelines, and other equipment often stem from corrosion.

SUMMARY

There exists a need in the oil and gas industry for protecting well casings and other tubular goods in a well from the corrosive effects of an acid. The present disclosure provides a variety of insights relating to technologies for alleviating corrosion in well casings and other tubular goods in a well via an acid corrosion inhibitor.

In some embodiments, the present disclosure provides an insight that an acid corrosion inhibitor can be formulated for an acid system comprising a mineral acid (for example, hydrogen chloride) and an organic acid (for example, methanesulfonic acid). For example, in some embodiments, an acid corrosion inhibitor as described herein may facilitate operating conditions (for example, high temperature, acid content, duration, etc.) in which previous acid corrosion inhibitors could not perform effectively.

In some embodiments, the present disclosure provides an insight that a desired rate and/or extent of corrosion inhibition can be achieved by controlling one or more particular parameters. Among other things, the present disclosure demonstrates specific embodiments of, one or more parameters related to preparations (for example, selection of ingredients, concentrations, etc.).

In one aspect, the present disclosure provides an acid corrosion inhibitor comprising an active corrosion intermediate comprising alkylated pyridine; an internal intensifier comprising formic acid; a filming additive comprising cinnamaldehyde; a surfactant comprising propylene glycol methyl ether and/or alcohol ethoxylate; and a solvent comprising ethylene glycol.

In some embodiments, the acid corrosion inhibitor is characterized in that it inhibits corrosion in the presence of an acid system comprising hydrochloric acid (HCl), formic acid, acetic acid, hydrofluoric acid (HF), methanesulfonic acid (MSA), or combinations thereof.

In some embodiments, the acid corrosion inhibitor is characterized in that it inhibits corrosion in the presence of an acid system comprising MSA.

In some embodiments, the active corrosion intermediate further comprises quaternary ammonium salt, methanol, and/or ethanolamine hydrochloride.

In some embodiments, the composition further comprises water.

In some embodiments, the propylene glycol methyl ether is dipropylene glycol methyl ether.

In some embodiments, the alcohol ethoxylate has repeating units of 12 to 15.

In some embodiments, a weight percentage of the active corrosion intermediate is within a range of 14-17 weight (wt) %.

In some embodiments, a weight percentage of the internal intensifier is within a range of 9-12 wt %.

In some embodiments, a weight percentage of the filming additive is within a range of 9-12 wt %.

In some embodiments, a weight percentage of the surfactant is within a range of 18-24 wt %.

In some embodiments, a weight percentage of the propylene glycol methyl ether is within a range of 11-14 wt %.

In some embodiments, a weight percentage of the alcohol ethoxylate is within a range of 7-10 wt %.

In some embodiments, the acid system does not comprise an organosulfur compound.

In some embodiments, the acid system does not comprise an iodide compound.

In some embodiments, the acid corrosion inhibitor does not comprise an oxime.

In some embodiments, the acid corrosion inhibitor is characterized in that it inhibits corrosion in the presence of the acid system comprising HCl with a concentration up to about 31 wt %.

In some embodiments, the acid corrosion inhibitor is characterized in that it inhibits corrosion at a temperature of about 300 degrees F. or greater.

In some embodiments, the acid corrosion inhibitor is characterized in that it inhibits corrosion for about 3 hours or more.

In some embodiments, the acid corrosion inhibitor is characterized in that it inhibits corrosion for about or more than 6 hours when temperature is about 275 degrees F. or less.

In some embodiments, the acid corrosion inhibitor does not comprise an additional intensifier and/or an iodide compound.

In some embodiments, the acid corrosion inhibitor is characterized by a viscosity within a range of about 15 to 25 cP at temperature of about 20° C.

In some embodiments, the acid corrosion inhibitor provides sufficient corrosion inhibition, so that a corrosion rate of a metal surface is less than or equal to about 0.05 pound per square foot and/or a pitting index is less than or equal to 3.

In another aspect, the present disclosure provides an acid corrosion inhibitor comprising alkyl pyridine; formic acid;

cinnamaldehyde; propylene glycol methyl ether and/or alcohol ethoxylate; and ethylene glycol.

In some embodiments, the acid corrosion inhibitor is characterized in that it inhibits corrosion in the presence of an acid system comprising hydrochloric acid (HCl), formic acid, acetic acid, hydrofluoric acid (HF), methanesulfonic acid (MSA), or combinations thereof.

In some embodiments, the acid corrosion inhibitor is characterized in that it inhibits corrosion in the presence of an acid system comprising MSA.

In another aspect, the present disclosure provides a system comprising: a formulation comprising alkyl pyridine, formic acid, cinnamaldehyde, propylene glycol methyl ether and/or alcohol ethoxylate, and ethylene glycol; an acid system comprising HCl and MSA; and a metal surface contacting the formulation and/or the acid system.

In another aspect, the present disclosure provides a method for reducing corrosion of a pipe in a well bore comprising applying the acid corrosion inhibitor. In some embodiments, the pipe is in contact with an acid system comprising methanesulfonic acid (MSA).

In some embodiments, the acid corrosion inhibitor or the formulation provides sufficient corrosion inhibition, so that a corrosion rate of a metal surface of the pipe is less than 0.05 pound per square foot, or a pitting index is less than 3.

In some embodiments, the corrosion rate of the metal surface in the presence of the acid corrosion inhibitor or the formulation is lower than a corrosion rate in the absence of the acid corrosion inhibitor or the formulation.

In some embodiments, a temperature is within a range of about 30-400° F.

Various embodiments of the subject matter described in this application are set forth in the following detailed description and claims.

DETAILED DESCRIPTION

It is contemplated that systems, devices, methods, and processes of the present application encompass variations and adaptations developed using information from the embodiments described in the following description. Adaptation and/or modification of the methods and processes described in the following description may be performed by those of ordinary skill in the relevant art.

Throughout the description, where compositions, compounds, or products are described as having, including, or comprising specific components, or where processes and methods are described as having, including, or comprising specific steps, it is contemplated that, additionally, there are articles, devices, and systems of the present application that consist essentially of, or consist of, the recited components, and that there are processes and methods according to the present application that consist essentially of, or consist of, the recited processing steps.

It should be understood that the order of steps or order for performing certain actions is immaterial so long as the described method remains operable. Moreover, two or more steps or actions may be conducted simultaneously.

The mention in the present application of any publication, for example, in the Background section, is not an admission that the publication serves as prior art with respect to any of the presented claims. The Background section is presented for purposes of clarity and is not meant as a description of prior art with respect to any claim. Headers are provided for the convenience of the reader and are not intended to be limiting with respect to the claimed subject matter.

As used in the present disclosure, the term "about" refers to a value that is similar, in context to the referenced value. In general, those skilled in the art, familiar with the context, will appreciate the relevant degree of variance encompassed by "about" in that context. For example, in some embodiments, the term "about" may encompass a range of values that within 25%, 20%, 19%, 18%, 17%, 16%, 15%, 14%, 13%, 12%, 11%, 10%, 9%, 8%, 7%, 6%, 5%, 4%, 3%, 2%, 1%, or less of the referred value. In some embodiments, "about" refers to ±10%, ±9%, ±8%, ±7%, ±6%, ±5%, ±4%, ±3%, ±2%, ±1% of a referenced value.

As used in the present disclosure, the term "acid corrosion inhibitor" refers to any formulation or composition that reduces, decreases or slows the rate of corrosion of a metal surface contacting an acid system.

As used herein, the term "alkenyl" refers to an alkyl group, as defined herein, having one or more double bonds.

As used herein, the term "alkyl" is given its ordinary meaning in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In some embodiments, alkyl has 1-100 carbon atoms. In certain embodiments, a straight chain or branched chain alkyl has about 1-20 carbon atoms in its backbone (e.g., $C_1$-$C_{20}$ for straight chain, $C_2$-$C_{20}$ for branched chain), and alternatively, about 1-10. In some embodiments, a cycloalkyl ring has from about 3-10 carbon atoms in their ring structure where such rings are monocyclic or bicyclic, and alternatively about 5, 6 or 7 carbons in the ring structure. In some embodiments, an alkyl group may be a lower alkyl group, wherein a lower alkyl group comprises 1-4 carbon atoms (e.g., $C_1$-$C_4$ for straight chain lower alkyls).

As used herein, the terms "heterocycle," "heterocyclyl," "heterocyclic radical," and "heterocyclic ring" are used interchangeably and refer to a stable 5- to 7-membered monocyclic or 7-10-membered bicyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl). A heterocyclic ring can be attached to its pendant group at any heteroatom or carbon atom that results in a stable structure and any of the ring atoms can be optionally substituted. Examples of such saturated or partially unsaturated heterocyclic radicals include tetrahydrofuranyl, tetrahydrothiophenyl pyrrolidinyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle," "heterocyclyl," "heterocyclyl ring," "heterocyclic group," "heterocyclic moiety," and "heterocyclic radical," are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

Without being bound by theory, it is understood that an acid corrosion inhibitor typically diffuses from its bulk solution to a metal surface and gets adsorbed to form a protective film on the metal surface. An acid corrosion inhibitor slows down the kinetics of the reduction and oxidation reaction taking place between the metal surface and an acid system present. An acid corrosion inhibitor can decrease these reactions by removing the reactants such as $O_2$ gas or by forming a film on the metal to block the anode and cathode reactions. There exists a need for improving and/or providing new acid corrosion inhibitors, particularly for those used in acid systems comprising a mineral acid (for example, hydrogen chloride), an organic acid (for example, methanesulfonic acid), or both a mineral acid and an organic acid.

Compositions for Corrosion Prevention

As described herein, the present disclosure provides compositions useful as corrosion inhibitors. For example, in some embodiments, an acid corrosion inhibitor in accordance with the present disclosure includes one or more of an active corrosion intermediate, an internal intensifier, a surfactant, a solvent, and a filming additive. In some embodiments, an acid corrosion inhibitor described herein includes one or more of an active corrosion intermediate, an internal intensifier, a surfactant, a solvent, a filming additive, and/or other additives.

In some embodiments, corrosion inhibitors described herein avoid the use of certain hazardous material found in other corrosion inhibitor formulations, such as nonylphenol ethoxylates, propargyl alcohol, or any other acetylenic alcohols.

As described generally herein, in some embodiments, an acid corrosion inhibitor includes an active corrosion intermediate. In some embodiments, an active corrosion intermediate is selected from the group consisting of alcohols, acetylenic alcohols, aromatic aldehydes, alkenylphenones, amines, amides, nitrogen-containing heterocycles or heteroaromatics (for example, imidazolyl, pyridinyl, quinolinyl, triazolyl, and thiazolyl-based compounds, including those that are optionally substituted, for example with one or more alkyl moieties), nitriles, imminium salts, thiourea derivatives, thiosemicarbazide, thiocyanates, quaternary salts (e.g., quaternary ammonium salts), condensation products of carbonyls and amines (for example, amides), and combinations thereof. In some embodiments, an active corrosion intermediate is or comprises an alkylated pyridinyl (for example, a mixture of alkylated pyridines), methanol, ethanolamine hydrochloride, and a quarternary ammonium salt (for example, methyl-1-(phenylmethyl)-pyridinium chloride).

In some embodiments, an acid corrosion inhibitor comprises a formulation including an active corrosion intermediate within a concentration range of about 10-50 wt %, 10-40 wt %, 10-30 wt %, 10-20 wt %, 10-18 wt %, 10-17 wt %, 12-20 wt %, 12-18 wt %, 12-17 wt %, 14-20 wt %, 14-18 wt %, or 14-17 wt %. In some embodiments, an acid corrosion inhibitor comprises a formulation including an active corrosion intermediate within a concentration range of about 10-20 wt %. In some embodiments, an acid corrosion inhibitor comprises a formulation including an active corrosion intermediate within a concentration range of about 12-20 wt %. In some embodiments, an acid corrosion inhibitor comprises a formulation including an active corrosion intermediate within a concentration range of about 14-17 wt %. In some embodiments, an acid corrosion inhibitor comprises a formulation including an active corrosion intermediate with a concentration of about 10 wt %, 11 wt %, 12 wt %, 13 wt %, 14 wt %, 15 wt %, 16 wt %, 17 wt %, 18 wt %, 19 wt %, or 20 wt %. In some embodiments, an acid corrosion inhibitor comprises a formulation including an active corrosion intermediate with a concentration of about 15 wt %.

In some embodiments, an acid corrosion inhibitor includes an internal intensifier. Without wishing to be bound by any particular theory, an internal intensifier may assist inhibiting corrosion at high temperatures and/or long exposure time. In some embodiments, an internal intensifier is selected from the group consisting of formic acid, methyl formate, KI, CuI, CuCl, $Sb_2O_3$, $SbCl_3$, $Sb_2O_5$, $K_4Sb_2O_7$, $K_2H_2Sb_2O_7$, $Sb_2S_3$, $SbCl_5$, $K_2Sb_2(C_4O_6H_4)_2$, $Sb[(CH_2OH)_2]_3$, $BiCl_3$, $BiI_3$, BiOCl, $Bi_2O_3$, $BiOI_3$, $BiF_3$, bismuth tartrate, bismuth adduct of ethylene glycol and bismuth trioxide, bismuth subsalicylate, $SnCl_2$, $As^{3+}$, $Cr^{6+}$, $Cu^{2+}$, $Ni^{2+}$, $Sn^{2+}$, $Hg^{2+}$, calcium salts, and $MgCl_2$. In some embodiments, an internal intensifier comprises formic acid.

In some embodiments, an acid corrosion inhibitor comprises a formulation including an internal intensifier within a concentration range of about 1-20 wt %, 1-18 wt %, 1-16 wt %, 1-14 wt %, 1-12 wt %, 3-20 wt %, 3-18 wt %, 3-16 wt %, 3-14 wt %, 3-12 wt %, 5-20 wt %, 5-18 wt %, 5-16 wt %, 5-14 wt %, 5-12 wt %, 7-20 wt %, 7-18 wt %, 7-16 wt %, 7-14 wt %, 7-12 wt %, 9-20 wt %, 9-18 wt %, 9-16 wt %, 9-14 wt %, or 9-12 wt %. In some embodiments, an acid corrosion inhibitor comprises a formulation including an internal intensifier within a concentration range of about 9-12 wt %. In some embodiments, an acid corrosion inhibitor comprises a formulation including an internal intensifier with a concentration of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %. In some embodiments, an acid corrosion inhibitor comprises a formulation including an internal intensifier at a concentration of about 10 wt %.

In some embodiments, an acid corrosion inhibitor includes a surfactant. A surfactant may improve the dispersability of an acid corrosion inhibitor in an acid system (as emulsifiers providing dispersed emulsion) while wetting a surface of a metallic material. In some embodiments, and without being bound by theory, a surfactant may offer corrosion protection. In some embodiments, a surfactant comprises alcohol ethoxylate, and/or propylene glycol methyl ether. In some embodiments, a surfactant comprises nonylphenol ethoxylates, and/or 2-butoxyethanol. In some embodiments, alcohol ethoxylate has repeating units of ethylene oxide within a range of, 1 to 30, 1 to 20, 1 to 15, 5 to 30, 5 to 20, 5 to 15, 10 to 30, 10 to 20, 10 to 15, or 12 to 15. In some embodiments, propylene glycol methyl ether is dipropylene glycol methyl ether.

In some embodiments, an acid corrosion inhibitor comprises one or more surfactants within a concentration range of about 10-30 wt %, 10-25 wt %, 12-30 wt %, 12-25 wt %, 14-30 wt %, 14-25 wt %, 16-30 wt %, 16-25 wt %, 18-30 wt %, 18-25 wt %, or 18-24 wt %. In some embodiments, an acid corrosion inhibitor comprises one or more surfactants within a concentration range of about 18-24 wt %. In some embodiments, an acid corrosion inhibitor comprises one or more surfactants with a concentration of about 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %.

In some embodiments, an acid corrosion inhibitor comprises alcohol ethoxylate within a concentration range of about 1-20 wt %, 1-15 wt %, 1-10 wt %, 3-20 wt %, 3-15 wt %, 3-10 wt %, 5-20 wt %, 5-15 wt %, 5-10 wt %, 7-20 wt %, 7-15 wt %, or 7-10 wt %. In some embodiments, an acid corrosion inhibitor comprises alcohol ethoxylate within a concentration range of about 7-10 wt %. In some embodiments, an acid corrosion inhibitor comprises alcohol ethoxylate with a concentration of about 5 wt %, 6 wt %, 7 wt %, 8 wt %, 9 wt %, 10 wt %, 11 wt %, 12 wt %, 13 wt %, 14 wt %, or 15 wt %. In some embodiments, an acid corrosion inhibitor comprises propylene glycol methyl ether within a concentration range of about 1-30 wt %, 1-25 wt %, 1-20 wt %, 1-15 wt %, 5-30 wt %, 5-25 wt %, 5-20 wt %, 5-15 wt %, 10-30 wt %, 10-25 wt %, 10-20 wt %, 10-15 wt %, 11-30 wt %, 11-25 wt %, 11-20 wt %, 11-15 wt %, or 11-14 wt %. In some embodiments, an acid corrosion inhibitor comprises propylene glycol methyl ether within a concentration rage of about 11-14 wt %. In some embodiments, an acid corrosion inhibitor comprises propylene glycol methyl ether with a concentration of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

In some embodiments, an acid corrosion inhibitor comprises two surfactants. In some embodiments an acid corrosion inhibitor comprises dipropylene glycol methyl ether and alcohol ethoxylate. In some embodiments, an acid corrosion inhibitor comprises about 12 wt % of dipropylene glycol methyl ether, and about 8 wt % of alcohol ethoxylate.

In some embodiments, an acid corrosion inhibitor includes a solvent. A solvent may reduce viscosity of an acid corrosion inhibitor for ease of handling. A solvent may also increase formulation stability. Additionally or alternatively, a solvent may improve solubility and dispersability of an acid corrosion inhibitor in an acid system, and/or wettability on an acid-steel interface. In some embodiments, a solvent is selected from the group consisting of alcohols, glycols (for example, ethylene glycol), dimethylsulphoxide, dimethylacetamide, 1-methyl-2-pyrrolidone, tetramethylene sulphone, formic acid, formic acid derivatives (for example, dimethylformamide), and combinations thereof. In some embodiments, a solvent comprises ethylene glycol.

In some embodiments, an acid corrosion inhibitor comprises one or more solvents within a concentration range of about 10-50 wt %, 10-45 wt %, 10-40 wt %, 15-50 wt %, 15-45 wt %, 15-40 wt %, 20-50 wt %, 20-45 wt %, 20-40 wt %, 25-50 wt %, 25-45 wt %, 25-40 wt %, 30-50 wt %, 30-45 wt %, 30-40 wt %, 35-50 wt %, 35-45 wt %, 35-40 wt %, or 35-39 wt %. In some embodiments, an acid corrosion inhibitor comprises one or more solvents within a concentration range of about 35-39 wt %. In some embodiments, an acid corrosion inhibitor comprises one or more solvents with a concentration of about 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, or 45 wt %.

In some embodiments, an acid corrosion inhibitor includes a filming additive. A filming additive may create a molecular layer on a surface of metal to prevent water from contacting the metal surface. In some embodiments, a filming additive is selected from the group consisting of propargyl alcohol, its derivatives (for example, cinnamaldehyde), nitrogen aromatic-based compounds (for example, pyridinium benzyl quaternary chloride), and combinations thereof. In some embodiments, a filming additive comprises cinnamaldehyde (for example, trans-cinnamaldehyde).

In some embodiments, an acid corrosion inhibitor comprises one or more filming additives within a concentration range of about 1-20 wt %, 1-18 wt %, 1-16 wt %, 1-14 wt %, 1-12 wt %, 3-20 wt %, 3-18 wt %, 3-16 wt %, 3-14 wt %, 3-12 wt %, 5-20 wt %, 5-18 wt %, 5-16 wt %, 5-14 wt %, 5-12 wt %, 7-20 wt %, 7-18 wt %, 7-16 wt %, 7-14 wt %, 7-12 wt %, 9-20 wt %, 9-18 wt %, 9-16 wt %, 9-14 wt %, or 9-12 wt %. In some embodiments, an acid corrosion inhibitor comprises one or more filming additives within a concentration range of about 9-12 wt %. In some embodiments, an acid corrosion inhibitor comprises one or more filming additives with a concentration of about 5 wt %, 6 wt %, 7 wt %, 8 wt %, 9 wt %, 10 wt %, 11 wt %, 12 wt %, 13 wt %, 14 wt %, or 15 wt %.

In some embodiments, an acid corrosion inhibitor comprises about 10-20 wt % of an active corrosion intermediate; about 5-15 wt % of an internal intensifier; about 15-25 wt % of one or more surfactants; about 30-40 wt % of one or more solvents; and about 5-15 wt % one or more filming additives.

In some embodiments, an acid corrosion inhibitor comprises about 14-17 wt % of an active corrosion intermediate; about 9-12 wt % of an internal intensifier; about 18-24 wt % of one or more surfactants; about 35-39 wt % of one or more solvents; and about 9-12 wt % of one or more filming additives.

In some embodiments, an acid corrosion inhibitor comprises about 15 wt % of an active corrosion intermediate; about 10 wt % of an internal intensifier; about 20 wt % of one or more surfactants; about 37 wt % of one or more solvents; and about 10 wt % of one or more filming additives.

In some embodiments, an acid corrosion inhibitor comprises about 0.1-2 wt % of one or more active corrosion intermediates; about 5-15 wt % of one or more internal intensifiers; about 15-25 wt % of one or more surfactants; about 30-40 wt % of one or more solvents; and about 5-15 wt % one or more filming additives.

In some embodiments, an acid corrosion inhibitor comprises about 0.7-1.7 wt % of one or more active corrosion intermediates; about 7.5-11 wt % of one or more internal intensifiers; about 18-24 wt % of one or more surfactants; about 35-39 wt % of one or more solvents; and about 9-12 wt % of one or more filming additives.

In some embodiments, an acid corrosion inhibitor comprises about 0.75-1.5 wt % of one or more active corrosion intermediates; about 8.5-9 wt % of one or more internal intensifiers; about 20 wt % of one or more surfactants; about 37 wt % of one or more solvents; and about 10 wt % of one or more filming additives.

In some embodiments, an acid corrosion inhibitor comprises about 0.1-2 wt % of alkyl pyridine; about 5-15 wt % of formic acid; about 5-15 wt % of alcohol ethoxylate; about 10-20 wt % of dipropylene glycol methyl ether; about 30-40 wt % of ethylene glycol; and about 5-15 wt % of cinnamaldehyde.

In some embodiments, an acid corrosion inhibitor comprises about 0.7-1.7 wt % of alkyl pyridine; about 7.5-11 wt % of formic acid; about 7-10 wt % of alcohol ethoxylate; about 11-14 wt % of dipropylene glycol methyl ether; about 35-39 wt % of ethylene glycol; and about 9-12 wt % of cinnamaldehyde.

In some embodiments, an acid corrosion inhibitor comprises about 0.75-1.5 wt % of alkyl pyridine; about 8.5-9 wt % of formic acid; about 8 wt % of alcohol ethoxylate; about 12 wt % of dipropylene glycol methyl ether; about 37 wt % of ethylene glycol; and about 10 wt % of cinnamaldehyde.

In some embodiments, an acid corrosion inhibitor comprises DOWANOL™ DPM glycol ether, Lumulse™ EST-257, ethylene glycol, Alpha 1018, trans-cinnamaldehyde, formic acid, and water with concentrations summarized in Table 1A. DOWANOL™ DPM glycol ether is or comprises dipropylene glycol methyl ether. Lumulse™ EST-257 is or comprises alcohol ethoxylate having repeating units of ethylene oxide within a range of 12 to 15.

TABLE 1A

Compositions of an exemplary acid corrosion inhibitor

| Chemical (Trade Name) | Weight % |
|---|---|
| DOWANOL ™ DPM glycol ether | 11-14 |
| Lumplse ™ EST-257 | 7-10 |
| Ethylene Glycol | 35-39 |
| Alpha 1018 | 14-17 |
| Trans-Cinnamaldehyde (90-100%) | 9-12 |
| Formic Acid (85-90%) | 9-12 |
| Water | 6-9 |

In some embodiments, an acid corrosion inhibitor comprises DOWANOL™ DPM glycol ether, Lumulse™ EST-257, ethylene glycol, Alpha 1018, trans-cinnamaldehyde, formic acid, and water with concentrations summarized in Table 1B.

TABLE 1B

Compositions of an exemplary acid corrosion inhibitor

| Chemical (Trade Name) | Weight % |
|---|---|
| DOWANOL ™ DPM glycol ether | 12 |
| Lumulse ™ EST-257 | 8 |
| Ethylene Glycol | 37 |
| Alpha 1018 | 15 |
| Trans-Cinnamaldehyde (90-100%) | 10 |
| Formic Acid (85-90%) | 10 |
| Water | 8 |

In some embodiments, an acid corrosion inhibitor is formulated for an acid system an acid corrosion inhibitor includes one or more additives. In some embodiments, an additive is or comprises iron control agents, water wetting agents, anti-sludge agents, non-emulsifiers, stabilizers, and/or viscoelastic surfactants.

In some embodiments, an acid corrosion inhibitor may be formulated for an acid system that does not comprise an iodide compound and/or an organosulfur compound. In some embodiments, an acid corrosion inhibitor provides sufficient corrosion inhibition at a low temperature (for example, lower than 210° F.) without an iodide compound and/or an organosulfur compound. In some embodiments, an acid corrosion inhibitor may be formulated for an acid system that comprises an iodide compound and/or an organosulfur compound.

In some embodiments, an acid corrosion inhibitor does not comprise a component comprising an oxime moiety. In some embodiments, an acid corrosion inhibitor comprises a component comprising an oxime moiety. As used herein, an "oxime" moiety refers to a moiety in a compound of formula RR'C=NOH or HRC=NOH.

In some embodiments, an acid corrosion inhibitor in accordance with the present disclosure provides corrosion inhibition to a metal surface, while still increasing production of a subterranean formation by dissolving certain minerals. In some embodiments, an acid corrosion inhibitor is stable (for example, not exhibiting a phase separation and/or precipitation) in the presence of an acid system for the duration of time that the acid system is in contact with a metal surface. In some embodiments, an acid corrosion inhibitor does not exhibit solidification at an operating temperature of oil/gas recovery.

In some embodiments, an acid corrosion inhibitor provides sufficient corrosion inhibition so that a corrosion rate of a metal surface is not greater than about 0.05 pound per square foot.

In some embodiments, a corrosion rate may be calculated by the following equation:

$$\text{Corrosion rate} = \text{strip factor} \times \text{weight loss}$$

$$\text{where strip factor is } \frac{0.317 \text{ lb} \cdot \text{in}^2/\text{g} \cdot \text{ft}^2}{\text{Surface area (in}^2)}.$$

Alternatively, a corrosion rate may be calculated based on Tafel theory:

$$\text{Corrosion rate} = \frac{J_{Corr} \cdot K}{\rho \cdot A \cdot \sum_{i}^{r}(n_i w_i / A_i)}$$

where $J_{corr}$ is in amperes, $n_i$ is the valence of the alloying element "i" in equivalent/mole, $w_i$ is the mass fraction of the alloying element "i", A, is the atomic mass of the element "i", and r is the number of elements in the alloy. Corrosion Science 86 (2014) 17-41.

In some embodiments, an acid corrosion inhibitor provides sufficient corrosion inhibition so that a pitting index is not higher than 3. A pitting index estimates pitting (for example, localized corrosion) susceptibility with integer values ranging from 1 through 5, where a value of 1 designates a low susceptibility to pitting and 5 is a high susceptibility. Table 2 shows the definitions of the integers for the pitting index. Corrosion Science 86 (2014) 17-41.

TABLE 2

Definitions of the pitting index

| Rank | Description of Pitting |
|---|---|
| 0 | No pits. Surface similar as before test. |
| 1 | Intergranular corrosion on cut edges of coupon. Trace amount of pits of major surfaces. |
| 2 | Small, shallow pits on surface. Or etching of surfaces. |
| 3 | Scattered, deep pits on surface; less than 10. |
| 4 | Deep pitting and etching on surfaces. |
| 5 | Layers of metal degraded |
| 6 | Coupon almost diminished. |

In some embodiments, an acid corrosion inhibitor has a viscosity within a range of about 10 to 50, about 10 to 40, about 10 to 30, about 10 to 25, about 15 to 40, about 15 to 30, or about 15 to 25 centipoise (cP) measured at temperature of about 20° C.

In some embodiments, an acid corrosion inhibitor provides sufficient corrosion inhibition (for example, a corrosion rate of a metal surface ≤0.05 pound per square foot, or a pitting index ≤3) when an operating temperature is about or up to 200, 210, 220, 230, 240, 250, 260, 270, 280, 290, 300, 310, 320, 330, 340, 350, 360, 370, 380, 390, 400, 410, 420, 430, 440, 450, 460, 470, 480, 490 or 500° F. In some embodiments, an acid corrosion inhibitor provides sufficient corrosion inhibition (for example, a corrosion rate of a metal surface ≤0.05 pound per square foot, or a pitting index ≤3) when an operating temperature is within a range of about 30-400, or 30-300° F. In some embodiments, an acid corrosion inhibitor provides sufficient corrosion inhibition (for example, a corrosion rate of a metal surface ≤0.05 pound per square foot, or a pitting index ≤3) at least for 3 hours when an operating temperature is within a range of about 250-350° F.

In some embodiments, an acid corrosion inhibitor provides sufficient corrosion inhibition (for example, a corrosion rate of a metal surface ≤0.05 pound per square foot, or a pitting index ≤3), when an acid system comprises HCl within a concentration range of about 0.1-50 wt %, 0.1-40 wt %, 0.1-30 wt %, 1-50 wt %, 1-40 wt %, 1-30 wt %, 5-50 wt %, 5-40 wt %, or 5-30 wt %. In some embodiments, an acid corrosion inhibitor provides sufficient corrosion inhibition (for example, a corrosion rate of a metal surface ≤0.05 pound per square foot, or a pitting index ≤3), when an acid system comprises MSA within a concentration range of about 0.1-70 wt %, 0.1-60 wt %, 0.1-50 wt %, 0.1-40 wt %, 0.1-30 wt %, 1-70 wt %, 1-60 wt %, 1-50 wt %, 1-40 wt %, 1-30 wt %, 5-70 wt %, 5-60 wt %, 5-50 wt %, 5-40 wt %, or 5-30 wt %.

In some embodiments, an acid corrosion inhibitor provides sufficient corrosion inhibition (for example, a corrosion rate of a metal surface ≤0.05 pound per square foot, or a pitting index ≤3) for about 1-20 hrs. In some embodiments, an acid corrosion inhibitor provides sufficient corrosion inhibition (for example, a corrosion rate of a metal surface ≤0.05 pound per square foot, or a pitting index ≤3) for about or up to 1, 2, 3, 4, 5, 6, 7, 8, 9, 10, 11, 12, 13, 14, 15, 16, 17, 18, 19, or 20 hrs.

In some embodiments, a loading rate of an acid corrosion inhibitor to an acid system is within a range of about 1-100, 1-75, 1-50, 1-40, 1-30, or 1-20 gallon per thousand gallons (gpt).

In some embodiments, a metal surface comprises an alloy. In some embodiments, an alloy is selected from the group consisting of J55, N80, L80, P110, C1018, T95, and combinations thereof. The chemical compositions of the exemplary alloys are summarized in Table 3.

In some embodiments, the present disclosure provides a method of reducing corrosion of a metal surface comprising contacting the metal surface with an acid corrosion inhibitor, wherein the acid corrosion inhibitor includes an active corrosion intermediate, an internal intensifier, a surfactant, a solvent, and a filming additive, as described generally herein. In some embodiments, the metal surface is a component in machinery. In some embodiments, the metal surface is a component is machinery for use in oil and gas applications. In some embodiments, the machinery is located within a subterranean formation. In some embodiments, the machinery is contacted with an acid corrosion inhibitor prior to use in a subterranean formation. In some embodiments, the machinery is contacted with an acid corrosion inhibitor intermittently during use in a subterranean formation.

In some embodiments, the subterranean formation comprises one or more water injector wells, one or more disposal wells, and/or one or more geothermal wells. In some embodiments, the subterranean formation contains a hydrocarbon reservoir. In some embodiments, the subterranean formation comprises carbonates. In some embodiments, the subterranean formation comprises sandstone. In some embodiments, the subterranean formation comprises clastic sedimentary rock. For instance, in some embodiments, the subterranean formation comprises shale. In some embodiments, compositions and methods described in this application are useful for a well formation, for instance water injection wells, disposal wells, geothermal wells, or injectors. The injector can be a water injector or a gas injector. The disposal well can be a water disposal well or a drill cuttings disposal well. As compositions and methods described in this application can be useful in a variety of applications in which involve an acid system, applications of the compositions and methods described in this application

TABLE 3

Chemical Compositions of exemplary alloys

| | Chemical composition (%) | | | | | | | | |
|---|---|---|---|---|---|---|---|---|---|
| | C | Si | Mn | P | S | Cr | Ni | Cu | Mo | V |
| J55 | 0.34~0.39 | 0.20~0.35 | 1.25~1.50 | ≤0.020 | ≤0.015 | ≤0.15 | ≤0.20 | ≤0.20 | / | / |
| N80 | 0.34-0.38 | 0.20-0.35 | 1.45-1.70 | ≤0.020 | ≤0.015 | ≤0.15 | / | / | / | 0.11-0.16 |
| L80 | 0.15-0.22 | ≤1.00 | 0.25-1.00 | ≤0.020 | ≤0.010 | 12.0-14.0 | ≤0.20 | ≤0.20 | / | / |
| P110 | 0.26~0.395 | 0.17-0.37 | 0.40-0.70 | ≤0.020 | ≤0.010 | 0.80-1.10 | ≤0.20 | ≤0.20 | 0.15-0.25 | ≤0.08 |
| C1018 | 0.14-0.20 | / | 0.60-0.90 | ≤0.040 | ≤0.050 | / | / | / | / | / |
| T95 | 0.35 max | / | 1.2 max | 0.02 max | 0.01 max | 0.4-1.5 | 0.99 max | / | 0.25-0.85 | / |

In some embodiments, an acid system may further comprises an intensifier (for example, KI). In some embodiments, a concentration range of an intensifier (for example, KI) is within a range of about 0.01-1000, 0.1-1000, 1-1000, 0.01-500, 0.1-500, 1-500, 0.01-100, 0.1-100, 1-100, or 10-100 parts per thousand (ppt).

Uses of Corrosion Inhibitors

In some embodiments, the present disclosure describes compositions and methods for reducing corrosion of, for example, machinery in a subterranean formation, from an acid system.

are not limited to the oil and gas industry or to other industries contemplated in this application.

Examples

In order that the application may be more fully understood, the following examples are set forth. It should be understood that these examples are for illustrative purposes only and are not to be construed as limiting in any manner.

The present Example documents the performance of an acid corrosion inhibitor in accordance with the present disclosure relative to an existing commercial acid corrosion inhibitor.

An exemplary acid corrosion inhibitor including DOWANOL™ DPM glycol ether, Lumulse™ EST-257, ethylene glycol, Alpha 1018, trans-cinnamaldehyde, formic acid, and water was prepared. The compositions are summarized in Table 4 and Table 5.

TABLE 4

Compositions of an exemplary acid corrosion inhibitor

| Chemical (Trade Name) | Weight % |
|---|---|
| DOWANOL™ DPM glycol ether | 12 |
| Lumulse™ EST-257 | 8 |
| Ethylene Glycol | 37 |
| Alpha 1018 | 15 |
| Trans-Cinnamaldehyde | 10 |
| Formic Acid (85-90%) | 10 |
| Water | 8 |

TABLE 5

Detailed compositions of an exemplary acid corrosion inhibitor

| Trade name | Chemical composition | Weight % |
|---|---|---|
| DOWANOL™ DPM glycol ether | Dipropylene glycol methyl ether | 12% |
| Lumulse™ EST-257 | Alcohol C12-15 ethoxylate | 8% |
| Ethylene Glycol | Ethylene Glycol | 37% |
| Alpha 1018 | Quaternary ammonium salt | 10-12% |
|  | Methanol | 3-4.5% |
|  | Alkyl pyridine | 0.75-1.5% |
|  | Ethanolamine hydrochloride | 0.15-0.75% |
| Trans-Cinnamaldehyde (90-100%) | Trans-Cinnamaldehyde | 10% |
| Formic Acid 85-90% | Formic Acid | 8.5-9% |
|  | Water | 1-1.5% |
| Water | Water | 8% |

The prepared acid corrosion inhibitor ("F25") and a commercial acid corrosion inhibitor, Basocorr PP from BASF ("Baso"), were tested for an acid system comprising HCl (31 wt %) and MSA (69 wt %). Degrees of corrosion were determined by the pitting index and/or corrosion rate (lbs/ft$^2$).

Table 6 summarizes the performance test conditions and their results when the temperature was 275° F. Baso is known to perform best at a temperature of 275° F. in the presence of the tested acid system. The maximum duration of Baso was about 3 hrs as shown in Tests 1 and 5. However, F25 out performed Baso. F25 extended the contact time by double, at 6 hrs, as indicated in Tests 2-4 and 6-8.

TABLE 6

Performance tests at temperature of 275° F.

| Test # | Time | Pipe material | Temp. | Inhibitor (conc.) | Intensifier (conc.) | Corrosion (lbs/ft$^2$) | Pit Rank |
|---|---|---|---|---|---|---|---|
| 1 | 3 hrs | C1018 | 275° F. | Baso (20 gpt) | KI (70 ppt) | 0.0122 | 1-2 |
| 2 | 3 hrs | N80 | 275° F. | F25 (20 gpt) | KI (40 ppt) | 0.05 | 0 |
| 3 | 3 hrs | C1018 | 275° F. | F25 (20 gpt) | KI (40 ppt) | 0.0437 | 1 |
| 4 | 3 hrs | T95 | 275° F. | F25 (20 gpt) | KI (40 ppt) | 0.0325 | 0 |
| 5 | 4 hrs | C1018 | 275° F. | Baso (20 gpt) | KI (70 ppt) | 0.0937 | 2 |
| 6 | 6 hrs | N80 | 275° F. | F25 (20 gpt) | KI (70 ppt) | 0.048 | 0 |
| 7 | 6 hrs | C1018 | 275° F. | F25 (20 gpt) | KI (70 ppt) | 0.0388 | 0 |
| 8 | 6 hrs | T95 | 275° F. | F25 (20 gpt) | KI (70 ppt) | 0.023 | 0 |

Table 7 summarizes the performance test conditions and their results when the temperature was 200° F. F25 did not need the KI intensifier present in the acid system. F25 was able to inhibit the corrosion on its own, even with the high activity of HCl and MSA present. Without wishing to be bound by any particular theory, this could be because the internal intensifier present in the F25 formula that aides in the inhibition; not requiring the extra KI at low temperatures. However, Baso still needed the intensifier to inhibit corrosion. A minimum of 20 ppt of KI was required to pass corrosion tests at this low temperature.

TABLE 7

Performance tests at temperature of 200° F.

| Test # | Time | Pipe material | Temp | Inhibitor (conc.) | Intensifier (conc.) | Corrosion (lbs/ft$^2$) | Pit Rank |
|---|---|---|---|---|---|---|---|
| 9 | 6 hr | N80 | 200° F. | Baso (4 gpt) | KI (20 ppt) | 0.0331 | 0 |
| 10 | 6 hr | T95 | 200° F. | Baso (4 gpt) | KI (20 ppt) | 0.0177 | 0 |
| 11 | 6 hr | C1018 | 200° F. | Baso (10 gpt) | KI (30 ppt) | 0.0026 | 0 |
| 12 | 6 hr | N80 | 200° F. | F25 (10 gpt) | X | 0.0413 | 0 |
| 13 | 6 hr | C1018 | 200° F. | F25 (10 gpt) | X | 0.0218 | 0 |
| 14 | 6 hr | T95 | 200° F. | F25 (0 gpt) | X | 0.0118 | 0 |

Table 8 summarizes the performance test conditions and their results when the temperature was 300° F. F25 was able to perform up to 3 hrs at 300° F. in the acid system.

TABLE 8

Performance tests at temperature of 300° F.

| Test # | Time | Pipe material | Temp | Inhibitor (conc.) | Intensifier (conc.) | Corrosion (lbs/ft$^2$) | Pit Rank |
| --- | --- | --- | --- | --- | --- | --- | --- |
| 15 | 3 hr | N80 | 300° F. | F25 (20 gpt) | KI (70 ppt) | 0.0606 | 0 |
| 16 | 3 hr | C1018 | 300° F. | F25 (20 gpt) | KI (70 ppt) | 0.05 | 1 |
| 17 | 3 hr | T95 | 300° F. | F25 (20 gpt) | KI (70 ppt) | 0.0301 | 1 |

Other Embodiments

Certain embodiments of the present application were described supra. It is, however, expressly noted that the application is not limited to those embodiments, but rather the intention is that additions and modifications to what was expressly described in the present disclosure are also included within the scope of the application. Moreover, it is to be understood that the features of the various embodiments described in the present disclosure were not mutually exclusive and can exist in various combinations and permutations, even if such combinations or permutations were not made expressly, without departing from the spirit and scope of the application. Therefore, the disclosure should not be limited to certain implementations, but rather should be limited only by the spirit and scope of the following claims.

What is claimed is:

1. An acid corrosion inhibitor comprising:
   14-17 weight (wt) % of an active corrosion intermediate comprising alkylated pyridine;
   an internal intensifier comprising formic acid;
   9-12 wt % of a filming additive comprising cinnamaldehyde;
   a surfactant comprising one or more selected from the group consisting of propylene glycol methyl ether, alcohol ethoxylate, and combinations thereof; and
   a solvent comprising ethylene glycol,
   wherein the acid corrosion inhibitor is characterized in that it inhibits corrosion in the absence of an organo-sulfur compound.

2. The acid corrosion inhibitor of claim 1, wherein the acid corrosion inhibitor is characterized in that it inhibits corrosion in the presence of an acid system comprising hydrochloric acid (HCl), formic acid, acetic acid, hydrofluoric acid (HF), methanesulfonic acid (MSA), or combinations thereof.

3. The acid corrosion inhibitor of claim 2, wherein the acid corrosion inhibitor is characterized in that it inhibits corrosion in the presence of an acid system comprising MSA.

4. The acid corrosion inhibitor of claim 1, wherein the active corrosion intermediate further comprises one or more selected from the group consisting of quaternary ammonium salt, methanol, ethanolamine hydrochloride, and combinations thereof.

5. The acid corrosion inhibitor of claim 1, further comprising water.

6. The acid corrosion inhibitor of claim 1, wherein the propylene glycol methyl ether is dipropylene glycol methyl ether.

7. The acid corrosion inhibitor of claim 1, wherein the alcohol ethoxylate has repeating units of 12 to 15.

8. The acid corrosion inhibitor of claim 1, wherein a weight percentage of the internal intensifier is within a range of 9-12 wt %.

9. The acid corrosion inhibitor of claim 1, wherein a weight percentage of the surfactant is within a range of 18-24 wt %.

10. The acid corrosion inhibitor of claim 1, wherein a weight percentage of the propylene glycol methyl ether is within a range of 11-14 wt %.

11. The acid corrosion inhibitor of claim 1, wherein a weight percentage of the alcohol ethoxylate is within a range of 7-10 wt %.

12. The acid corrosion inhibitor of claim 1, wherein the acid system does not comprise an iodide compound.

13. The acid corrosion inhibitor of claim 1, wherein the acid corrosion inhibitor does not comprise an oxime.

14. The acid corrosion inhibitor of claim 1, wherein the acid corrosion inhibitor is characterized in that it inhibits corrosion in the presence of the acid system comprising HCl with a concentration up to about 31 wt %.

15. The acid corrosion inhibitor of claim 14, wherein the acid corrosion inhibitor is characterized in that it inhibits corrosion at a temperature of about 300 degrees F. or greater.

16. The acid corrosion inhibitor of claim 15, wherein the acid corrosion inhibitor is characterized in that it inhibits corrosion for about 3 hours or more.

17. The acid corrosion inhibitor of claim 14, wherein the acid corrosion inhibitor is characterized in that it inhibits corrosion for about or more than 6 hours when temperature is about 275 degrees F. or less.

18. The acid corrosion inhibitor of claim 17, wherein the acid corrosion inhibitor does not comprise an additional intensifier and/or an iodide compound.

19. The acid corrosion inhibitor of claim 1, wherein the acid corrosion inhibitor is characterized by a viscosity within a range of about 15 to 25 cP at temperature of about 20° C.

20. The acid corrosion inhibitor of claim 1, wherein the acid corrosion inhibitor provides sufficient corrosion inhibition, so that a corrosion rate of a metal surface is less than or equal to about 0.05 pound per square foot and/or a pitting index is less than or equal to 3.

21. An acid corrosion inhibitor comprising:
   14-17 weight (wt) % of alkyl pyridine;
   formic acid;
   9-12 wt % of cinnamaldehyde;
   one or more surfactants selected from the group consisting of propylene glycol methyl ether, alcohol ethoxylate, and combinations thereof; and
   ethylene glycol,
   wherein the acid corrosion inhibitor is characterized in that it inhibits corrosion in the absence of an organo-sulfur compound.

22. The acid corrosion inhibitor of claim 21, wherein the acid corrosion inhibitor is characterized in that it inhibits corrosion in the presence of an acid system comprising hydrochloric acid (HCl), formic acid, acetic acid, hydrofluoric acid (HF), methanesulfonic acid (MSA), or combinations thereof.

23. The acid corrosion inhibitor of claim 22, wherein the acid corrosion inhibitor is characterized in that it inhibits corrosion in the presence of an acid system comprising MSA.

24. A system comprising:
a formulation comprising 14-17 weight (wt) % of alkyl pyridine, formic acid, 9-12 wt % of cinnamaldehyde, and one or more surfactants selected from the group consisting of propylene glycol methyl ether, alcohol ethoxylate, and combinations thereof,
an acid system comprising HCl and MSA; and
a metal surface contacting the formulation and/or the acid system.

25. A method for reducing corrosion of a pipe in a well bore, the method comprising:
applying the acid corrosion inhibitor of claim 1,
wherein the pipe is in contact with an acid system comprising methanesulfonic acid (MSA).

26. The method of claim 25, wherein the acid corrosion inhibitor or the formulation provides sufficient corrosion inhibition, so that a corrosion rate of a metal surface of the pipe is less than 0.05 pound per square foot, or a pitting index is less than 3.

27. The method of claim 26, wherein the corrosion rate of the metal surface in the presence of the acid corrosion inhibitor or the formulation is lower than a corrosion rate in the absence of the acid corrosion inhibitor or the formulation.

28. The method of claim 25, wherein a temperature is within a range of about 30-400° F.

* * * * *